(12) United States Patent
Peralta et al.

(10) Patent No.: US 7,653,522 B2
(45) Date of Patent: Jan. 26, 2010

(54) ROBUSTNESS OPTIMIZATION SYSTEM

(75) Inventors: Richard C. Peralta, Hyde Park, UT (US); Ineke M. Kalwij, Mission (CA)

(73) Assignee: Utah State University, North Logan, UT (US)

(*) Notice: Subject to any disclaimer, the term of this patent is extended or adjusted under 35 U.S.C. 154(b) by 511 days.

(21) Appl. No.: 11/635,206

(22) Filed: Dec. 6, 2006

(65) Prior Publication Data
US 2007/0129930 A1 Jun. 7, 2007

Related U.S. Application Data

(60) Provisional application No. 60/748,694, filed on Dec. 7, 2005.

(51) Int. Cl.
*G06F 9/455* (2006.01)
(52) U.S. Cl. .............................. 703/6; 703/2
(58) Field of Classification Search ............... 703/6, 703/11, 2; 705/7, 8, 1; 435/7.1, 6; 716/2; 73/146; 702/188; 378/65; 717/140; 707/3
See application file for complete search history.

(56) References Cited

U.S. PATENT DOCUMENTS

| | | | | |
|---|---|---|---|---|
| 6,430,993 | B1* | 8/2002 | Seta ............................ | 73/146 |
| 6,988,076 | B2* | 1/2006 | Ouimet ......................... | 705/7 |
| 2002/0069079 | A1* | 6/2002 | Vega ............................ | 705/1 |
| 2002/0152057 | A1* | 10/2002 | Wang et al. .................. | 703/6 |
| 2003/0046279 | A1* | 3/2003 | McConaghy .................. | 707/3 |
| 2004/0128111 | A1* | 7/2004 | Lang .......................... | 702/188 |
| 2004/0161796 | A1* | 8/2004 | Gustafsson et al. ........... | 435/7.1 |
| 2005/0170379 | A1* | 8/2005 | Kita et al. .................... | 435/6 |
| 2005/0189415 | A1* | 9/2005 | Fano et al. ................... | 235/383 |
| 2005/0197875 | A1* | 9/2005 | Kauffman ..................... | 705/7 |
| 2005/0257178 | A1* | 11/2005 | Daems et al. ................. | 716/2 |
| 2005/0267720 | A1* | 12/2005 | Hill et al. ..................... | 703/11 |
| 2006/0015829 | A1* | 1/2006 | De Smedt et al. ............. | 716/2 |
| 2006/0064288 | A1* | 3/2006 | Ferryanto et al. ............. | 703/2 |
| 2006/0149608 | A1* | 7/2006 | Asgari et al. ................. | 705/8 |
| 2006/0248518 | A1* | 11/2006 | Kundert ....................... | 717/140 |

(Continued)

OTHER PUBLICATIONS

Aly, A.H. & Peralta, R.C., "Optimal design of aquifer cleanup systems under uncertainty using a neural network and a genetic algorithm", Water Resources Research, 1999, pp. 2523-2532, vol. 35, No. 8, American Geophysical Union, Washington, DC, USA.

(Continued)

*Primary Examiner*—Paul L Rodriguez
*Assistant Examiner*—Kandasamy Thangavelu

(57) ABSTRACT

Assume a decision strategy that is optimal for a primary objective function(s). Without unacceptably affecting the value of the primary objective function(s), Robustness Enhancing Optimizer (REO) modifies the optimal strategy's decision variable values to maximize the likelihood that implementing the new strategy in the real world will be satisfactory (will satisfy optimization problem constraints in the real world). Modification is via linked system parameter sensitivity analysis and multi-realization optimization. REO creates new realizations by changing system parameter(s) in a selected manner (for example, multiplying by a selected factor smaller or larger than 1 proportionally reduces or increases the parameter). REO is especially valuable where probability density functions or statistically-based realizations are unavailable, or where one wants to increase the robustness of satisfying constraints for multiple realities in a particular setting.

4 Claims, 9 Drawing Sheets

Flow Chart for Multiple Realizations Optimization.

U.S. PATENT DOCUMENTS

2007/0081629 A1* 4/2007 Yin et al. ............... 378/65

OTHER PUBLICATIONS

Cantiller, R.R.A & Peralta, R.C., "Computational Aspects of Chance-Constrained Sustained Groundwater Yield Management", Transactions of the ASAE, 1989, pp. 939-944, vol. 32, Issue 3, American Society of Agricultural Engineers, St. Joseph, Michigan, USA.

Chan, N., Robustness of the Multiple Realization Method for Stochastic Hydraulic Aquifer Management, Water Resources Research, 1993, pp. 3159-3167, vol. 29, No. 9, American Geophysical Union, Washington, DC, USA.

Chan, N, "Partial Infeasibility Method For Chance-Constrained Aquifer Management", Journal of Water Resources Planning and Management, 1994, pp. 70-89, vol. 120, American Society of Civil Engineers, Publications Office, New York, New York, USA.

Freeze, R.A. and Gorelick, S.M., "Convergence of Stochastic Optimization and Decision Analysis in the Engineering Design of Aquifer Remediation", Ground Water, 1999, pp. 934-954, vol. 37, No. 6, Water Well Journal Pub. Co., Worthington, Ohio, USA.

Morgan, D.R., Eheart, J.W., and Valocchi, A.J., Aquifer Remediation Design Under Uncertainty Using a New Chance Constrained Programming Technique, Water Resources Research, 1993, pp. 551-561, vol. 29, No. 3, American Geophysical Union, Washington, DC, USA.

Wagner, B. J., Recent advances in simulation-optimization groundwater management modeling, "Reviews of Geophysics, Supplement", 1995, pp. 1021-1028, vol. 33, No. (S1). American Geophysical Union, Washington, DC, USA.

Wagner, B.J., "Evaluating Data Worth For Ground-Water Management Under Uncertainty", Journal of Water Resources Planning and Management, 1999, pp. 281-288, vol. 125, No. 5, American Society of Civil Engineers, Water Resources Planning and Management Division, New York, New York, USA.

Ritzel, B.J., Eheart, J.W., and Ranjithan, S., "Using genetic algorithms to solve a multiple objective ground water pollution containment problem", Water Resources Research, 1994, pp. 1589-1603, vol. 30, No. 5, American Geophysical Union, Washington, DC, USA.

Smalley, J.B., Minkser, B.S., Goldberg, D.E., "Risk-based in situ bioremediation design using a noisy genetic algorithm", Water Resources Research, 2000, pp. 3043-3052, vol. 36, No. 10, American Geophysical Union, Washington, DC, USA.

* cited by examiner

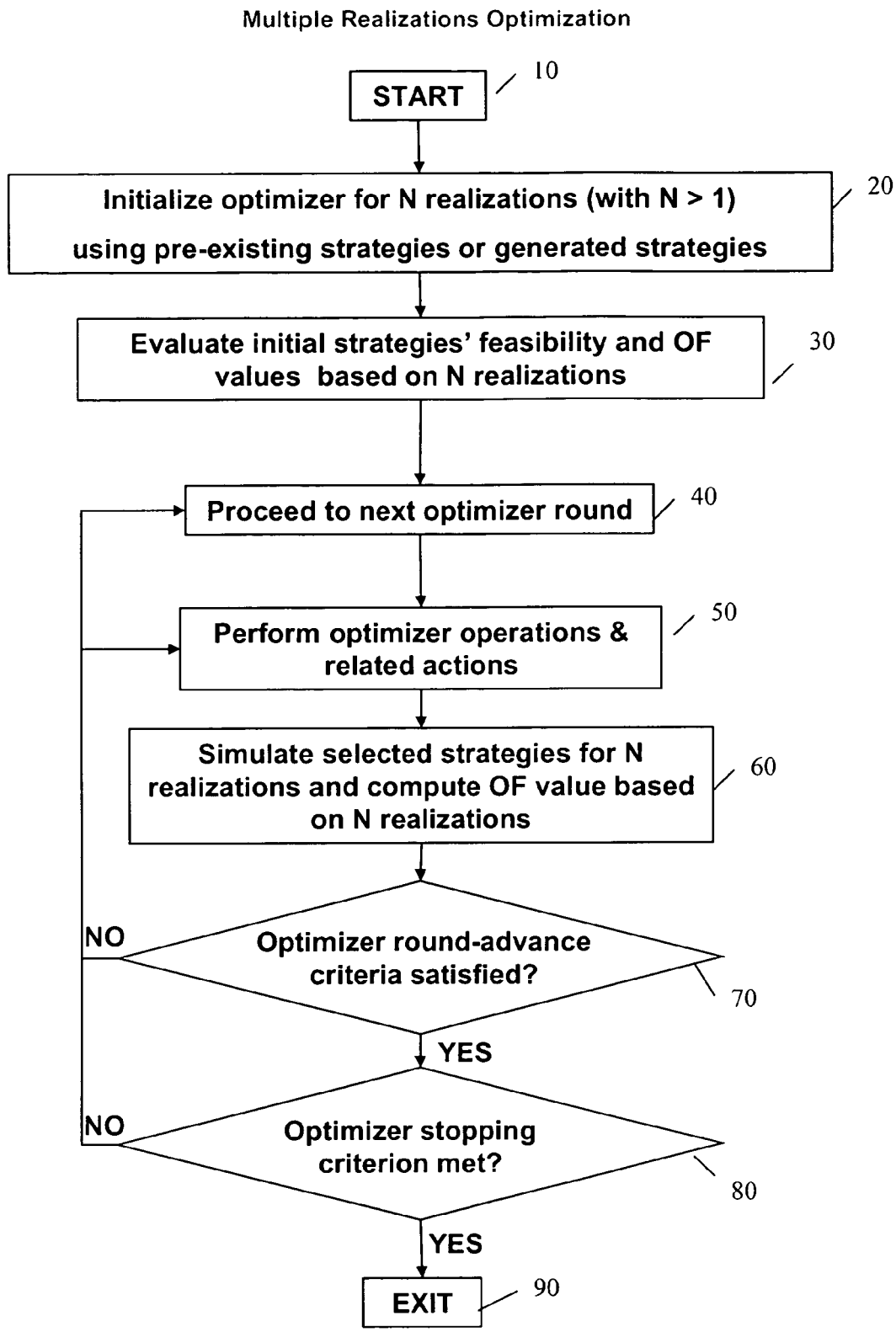
Figure 1. Flow Chart for Multiple Realizations Optimization.

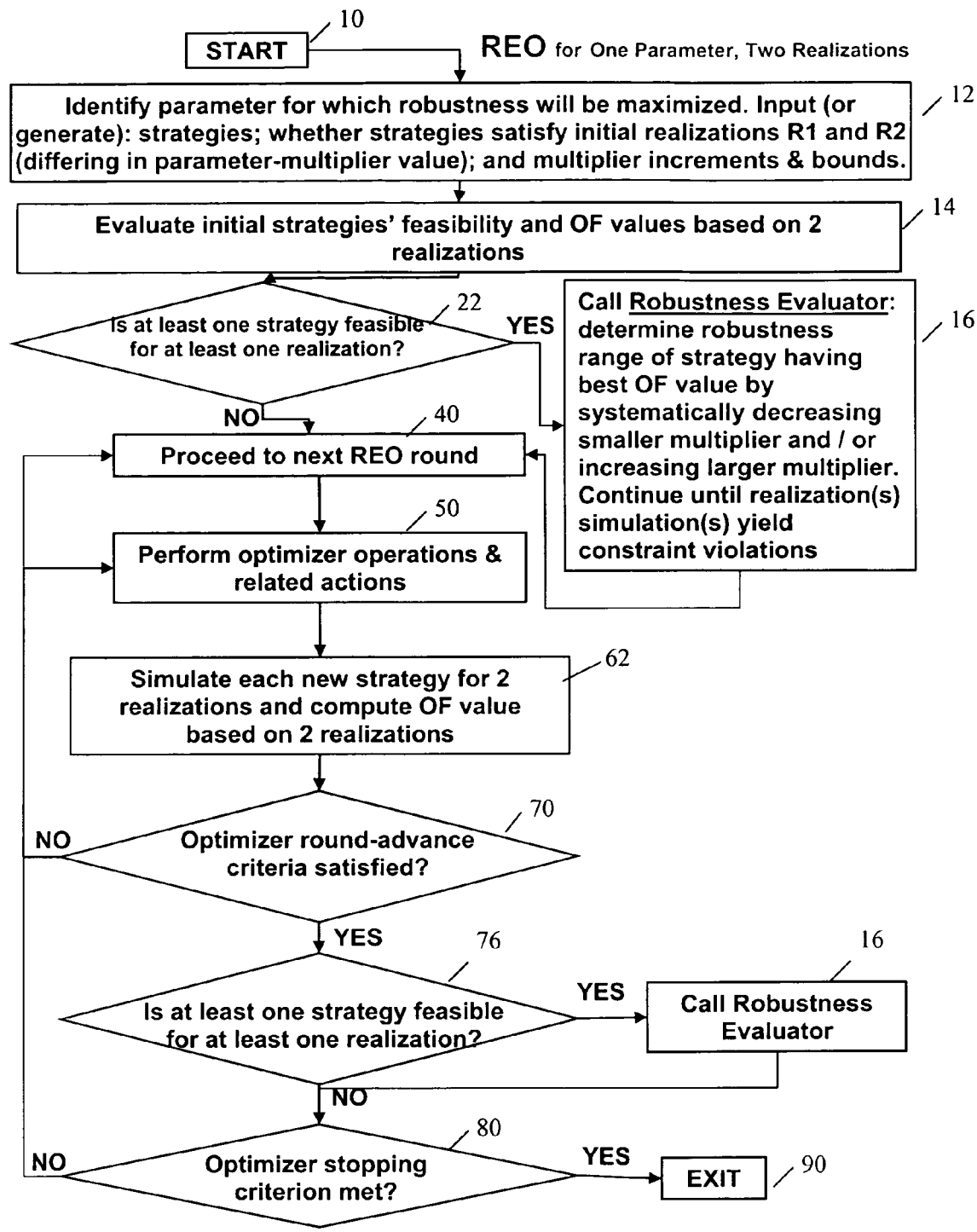
Figure 2. Flow chart for the REO for one parameter and two realizations

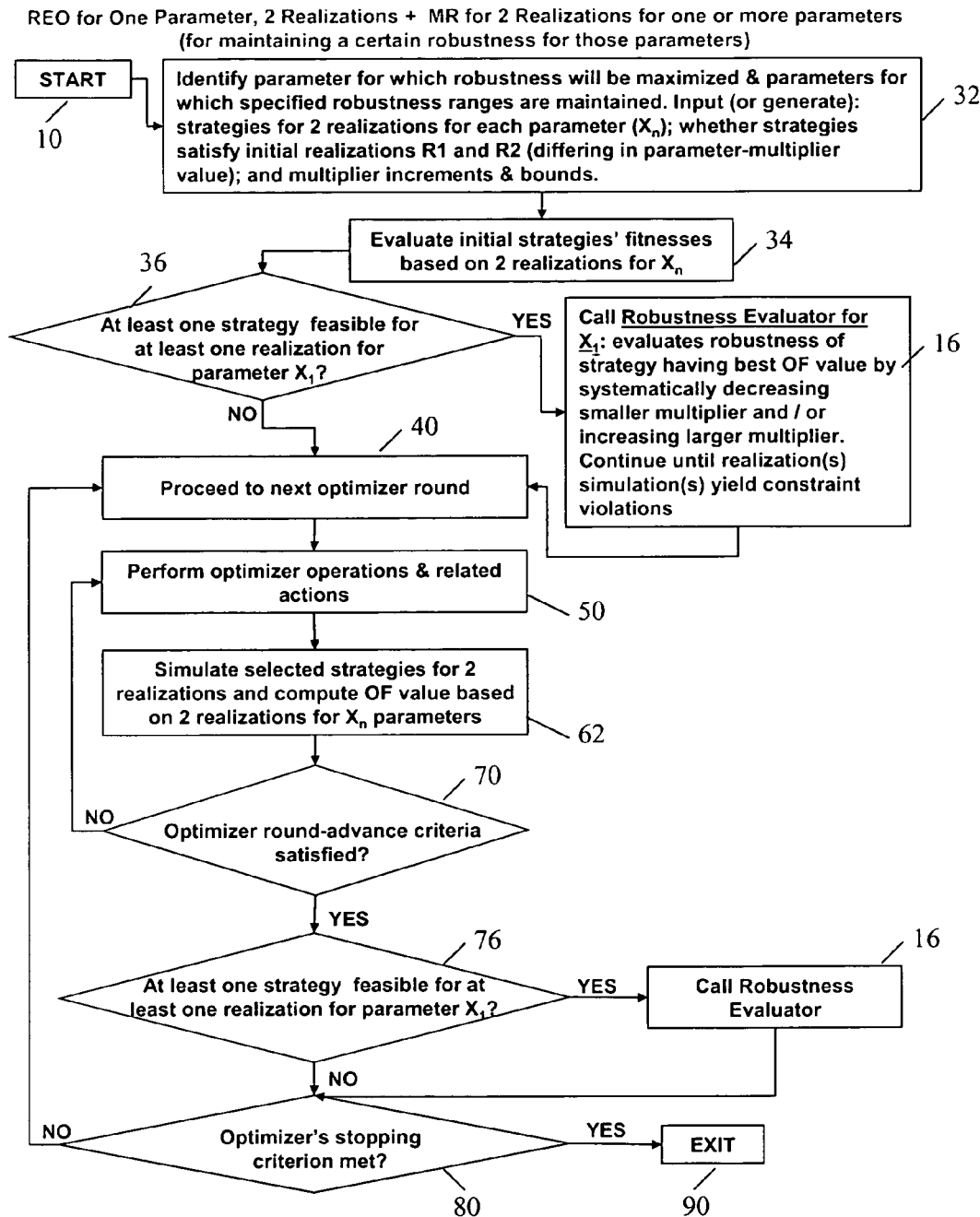
Figure 3. Flow chart for the REO for one or more parameters and two realizations for each parameter.

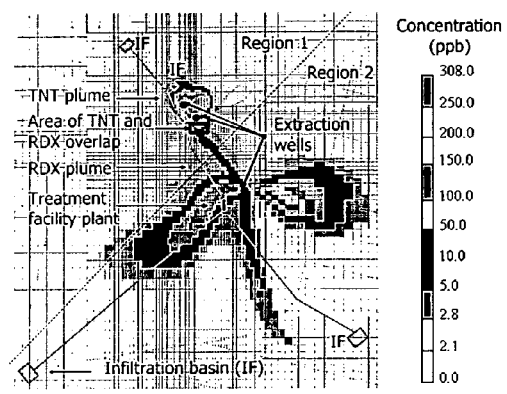
Figure 4. The pump and treat system at UCD, and initial RDX and TNT plumes in Layer 1, projected January 2003.

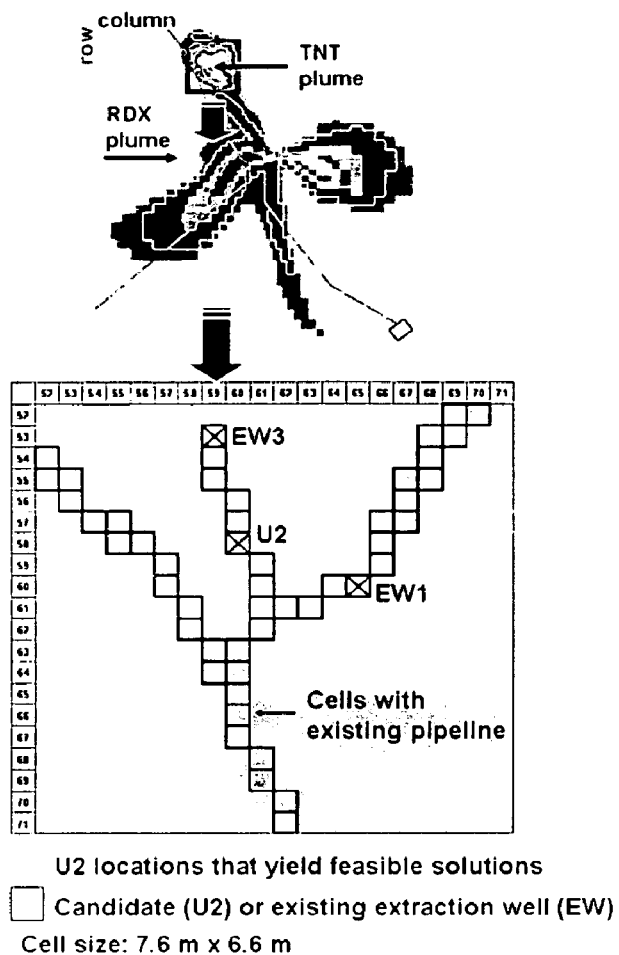
Figure 5. Optimal well locations and alternate well U2 feasible locations

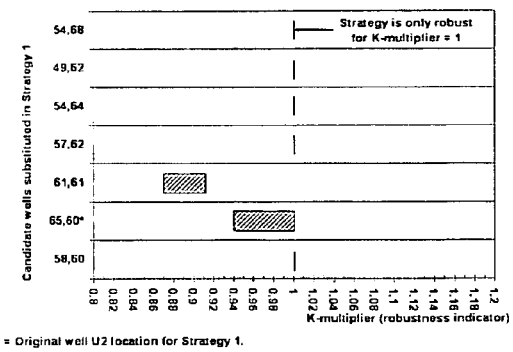
Figure 6. Robustness evaluator results for Strategy 1 using different U2 well locations.
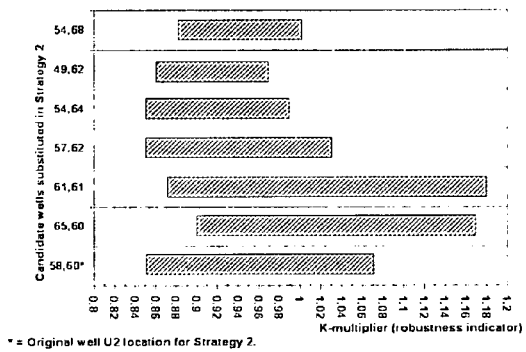
Figure 7. Robustness evaluator results for Strategy 2 using different U2 well locations.

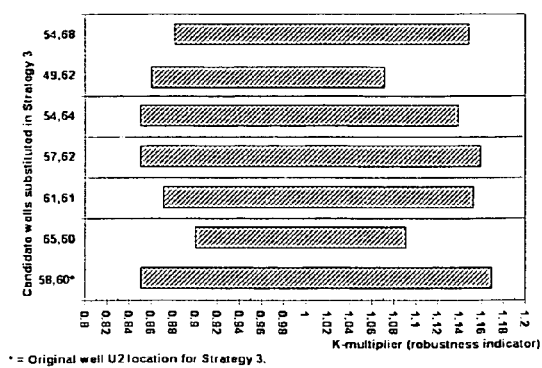
Figure 8. Robustness evaluator results for Strategy 3 using different U2 well locations.

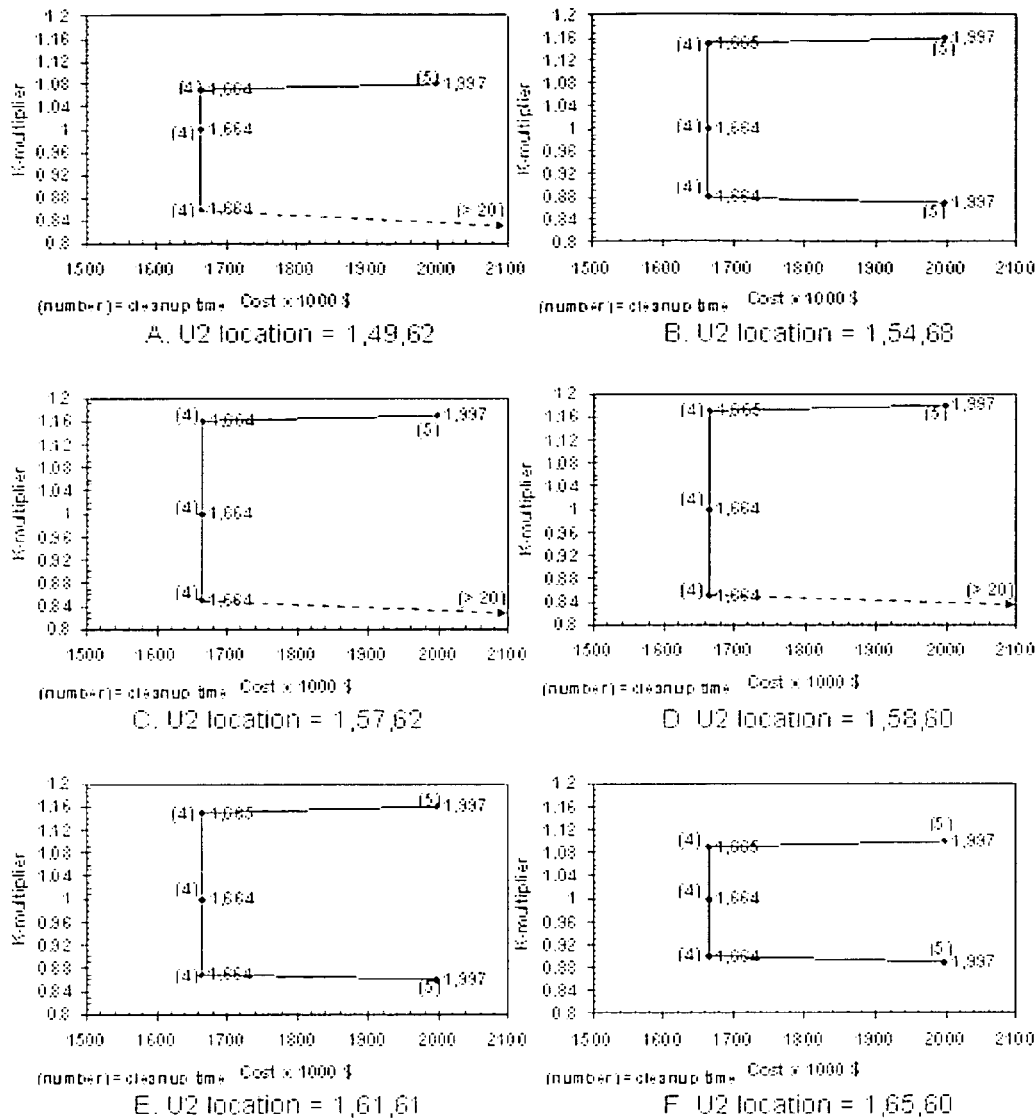
Figure 9. Effect of robustness on cost for Strategy 3 using six different U2 locations.

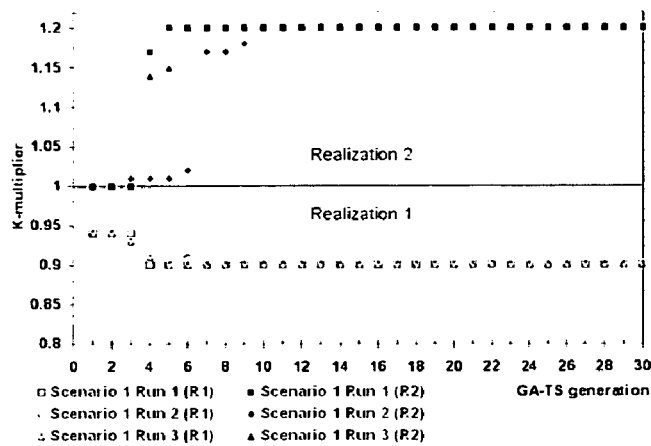
Figure 10. REO results for Scenario 1, Runs 1, 2, and 3.
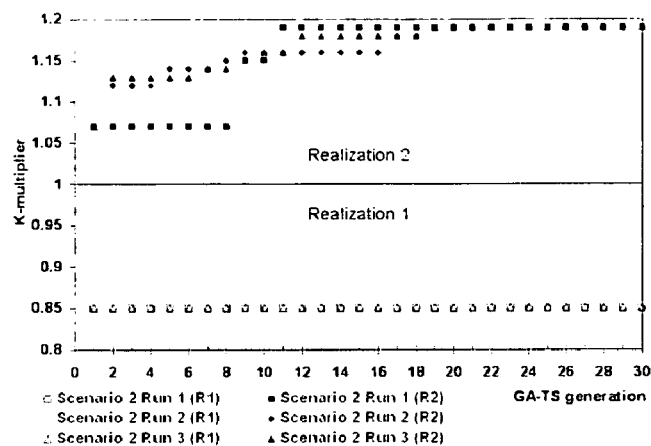
Figure 11. REO results for Scenario 2, Runs 1, 2, and 3.
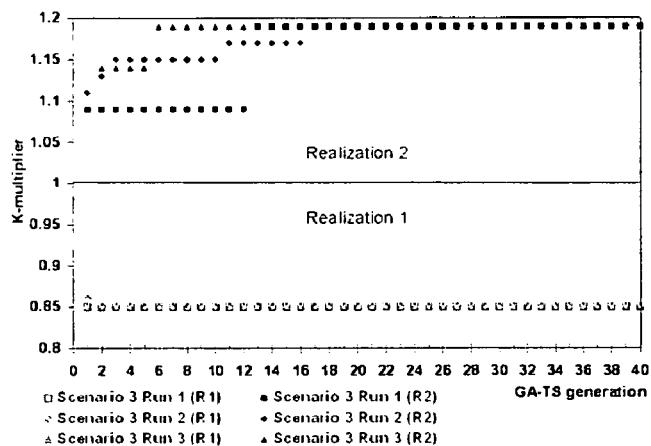
Figure 12. REO results for Scenario 3, Runs 1, 2, and 3.

ROBUSTNESS OPTIMIZATION SYSTEM

RELATED APPLICATIONS

This application claims priority to U.S. Patent Application No. 60/748,694 filed on Dec. 7, 2005, entitled "Robust Optimization System", and is incorporated herein by reference.

TECHNICAL FIELD

This present invention relates to methods and devices for simulation optimization and to methods and devices for robust solutions for simulations.

BACKGROUND

Simulation models are approximations of physical systems. If an actual physical system differs from its simulation model, management strategies designed using a model might not satisfy management goals in reality.

Simulation/Optimization (S/O) model accuracy is only as good as that of the employed simulation models. Because optimization may cause constraints to be tight, deterministic mathematically optimal strategies might not be very robust. In other words, a small difference between reality and model-assumed parameters could cause an optimization problem constraint to be violated in reality although it is satisfied in the model.

On the other hand, a reliable or robust solution strategy will achieve management goals in reality even if the physical system differs from the model. We disclose a practical way of increasing optimal solution strategy robustness without harming the objective function (OF) value, even if data concerning the real system is limited.

A 'realization' is an "assumed reality" or one set of physical system parameters assumed within a model. In chance-constrained programming (CCP), relations based on a probability distribution are incorporated as constraints in the optimization problem. The multiple realization approach (MRA) puts constraints of several different realizations into one optimization model. The optimization model satisfies all the constraints of all realizations simultaneously.

CCP and MRA are powerful mathematical tools for developing reliable strategies and for developing tradeoff curves for reliability versus desired solution parameters. However, both approaches have historically relied upon the ability to quantify random processes and establish a probability density function (PDF) for real system parameters. Accurately establishing a PDF requires a significant amount of real system data. For most real-world problems, cost prevents sufficient accurate data collection.

Sensitivity analysis provides insight into the robustness of a solution but does not tell how to make a solution more robust. Using trial-and-error to modify a solution to make it more robust is inefficient. Here we disclose a more efficient approach for improving solutions.

This Robustness Enhancing Optimizer (REO) incorporates sensitivity analysis within a S/O model to guide optimization. REO maximizes robustness for selected system parameters while maintaining a predetermined value for a primary OF (such as a least cost for a cost minimization problem).

Reliability evaluation and robustness evaluation both address parameter uncertainty by simulating response of different realizations to the same set of decision variables or stimuli. However, here we distinguish between robustness and reliability.

Reliability is determined by: (a) developing many alternative realities (realizations) of the study area by changing model assumptions stochastically based on a probability density function or statistically derived information; and then (b) simulating how a particular decision strategy affects the system represented by each realization (i.e., by running one simulation of the strategy per realization). If the results of a simulation satisfy all optimization problem constraints, the strategy is considered feasible for that realization. A decision strategy's reliability is the percentage of N-realizations that yield feasible results for that strategy (with N greater than 1).

A decision strategy's robustness is determined using deterministically created realizations. For example, a realization can be produced by multiplying a calibrated system parameter array set by an assumed factor smaller than 1 or larger than 1, respectively representing a systematic proportional reduction or increase in the array values. A strategy is considered feasible for that realization if the results of simulating the strategy satisfy all optimization problem constraints. A strategy's parameter robustness range is here defined as the range of parameter multipliers for the multi-layer calibrated parameter arrays for which the strategy will satisfy all constraints and retain the same objective function value.

SUMMARY OF THE INVENTION

A new simulation/optimization modeling approach is presented for addressing uncertain knowledge of reality. The Robustness Enhancing Optimizer (REO) couples optimizers (examples are genetic algorithm and tabu search), with model parameter sensitivity analysis to guide multiple-realization optimization. The REO maximizes strategy robustness for a solution strategy that is desired, optimal, or is selected for a primary objective function (OF). The primary OF strategy might or might not have been developed using optimization. The more robust a strategy, the more likely it is to achieve management goals in practice, even if the physical system differs from the model. The REO efficiently develops robust solution strategies while maintaining primary OF value, and perhaps optimality—differing from the common situation in which a primary OF value degrades as strategy reliability increases. The preferred way that REO does this is by maximizing looseness of the important constraints that are tight in the strategy of the primary OF (i.e. that seem to restrict further improvement in the primary OF value). Another, more tedious, way is to determine robustness of each developed strategy, and then treat robustness as a parameter that is optimized directly. The REO is especially valuable where data to develop realistic probability density functions or statistically derived realizations are unavailable. Because they require much less field data, REO-developed strategies might not achieve as high a mathematical reliability as strategies developed using many realizations based upon real parameter probability density functions. However, REO-developed strategies might still yield a better OF value in the field.

In one embodiment a digital computer is used to model a physical system. Variable parameters and optimization problem constraints are identified, and the desired OF equation is established. A set of variable values and a resulting desirable target OF value is determined (these might be developed during a first round of optimization using standard methods, or might be developed in another way). The set of variable values can be termed a 'strategy'. Robustness of the strategy is evaluated by calculating the largest multiplier and smallest multiplier for the physical parameter realization that still provides an OF value within an acceptable tolerance of the target OF value, and satisfies all optimization problem constraints. Subsequently, optimization is performed while satisfying constraints appropriate for realizations created using both the largest multiplier and smallest multiplier and iterating the robustness limit evaluation and optimization until the process converges to no additional improvement in OF value or robustness. The final output solution is the robustness enhanced optimized solution.

DESCRIPTION OF THE FIGURES

FIG. 1. Flow chart for multiple realizations optimization.

FIG. 2. Flow chart for the REO for one parameter and two realizations

FIG. 3. Flow chart for the REO for one or more parameters and two realizations for each parameter FIG. 4. The pump and treat system at UCD, and initial RDX and TNT plumes in Layer 1, projected January 2003.

FIG. 5. Optimal well locations and alternate well U2 feasible locations.

FIG. 6. Robustness evaluator results for Strategy 1 using different U2 well locations.

FIG. 7. Robustness evaluator results for Strategy 2 using different U2 well locations.

FIG. 8. Robustness evaluator results for Strategy 3 using different U2 well locations.

FIG. 9. Effect of robustness on cost for Strategy 3 using six different U2 locations.

FIG. 10. REO results for Scenario 1, Runs 1, 2, and 3.

FIG. 11. REO results for Scenario 2, Runs 1, 2, and 3.

FIG. 12. REO results for Scenario 3, Runs 1, 2, and 3.

DETAILED DESCRIPTION OF THE INVENTION

This disclosure presents the Robustness Enhancing Optimizer (REO) that maximizes robustness for selected uncertain model parameters while maintaining a predetermined value (or within a predetermined tolerance of that value) for a primary OF (such as a least cost for a cost minimization problem). The primary OF value might have been developed with or without using optimization. The more robust a strategy, the more likely it is to achieve management goals in practice, even if the physical system differs from the model. The REO efficiently develops robust solution strategies while maintaining primary OF value—differing from the common situation in which a primary OF value degrades as strategy reliability increases. The preferred way that REO does this is by maximizing looseness of the important constraints that are tight in the primary optimization. Another, more tedious, way is to determine robustness of each developed strategy, and then treat robustness as a parameter that is optimized directly. The REO is especially valuable where data to develop realistic probability density functions or statistically derived realizations are unavailable.

A "strategy" is a set of decision and state variables representing system stimuli and system response, respectively. An objective function value results from a strategy. An objective function reflects the goal of the optimization problem formulation, and basically drives the optimization.

"Decision variables" are the input to the simulation model of a system whereas the state variables are the output from the simulation model of a system, due to stimulation of the system. State variables reflect the system's performance. Generally, a set of decision variables represent a management decision that influences the real system. The management decision can be environmental, economical, political, cultural, technological, sociological, medical, psychological or otherwise of nature, depending on the problem and the (real) system being optimized or modeled.

A "real system" is the system that is being modeled. A system can be considered as interactive, multi-dimensional and dynamic configurations. A "system" is "an interrelated, interworking set of objects that operates independently.

"Configurations" are characterized by environmental, economical, political, cultural, technological, sociological, medical, psychological or other features (and are problem specific). A real system is complex and is generally dynamic of nature (i.e. time dependent or changes over time).

"Modeling a system" means creating a simplification and generalization of the real world, i.e. assumptions are made with respect to environmental, economical, political, cultural, technological, sociological, medical, psychological or other parameters (system's features). Which parameters are assumed depends on what system is being modeled. Furthermore, modeling a system often requires defining boundaries and setting boundary conditions, and that requires making assumptions. In engineering, modeling a system generally means a mathematical description/interpretation of a (real) system.

REO consists of an S/O model with multiple realization approach and automatic conditioning to increase strategy robustness. FIG. 1 illustrates the multiple realization optimization approach. A decision strategy is simulated N times, equal to the number of realizations. FIG. 2 shows the flow chart for the REO for one uncertain parameter and two realizations. FIG. 3 shows the embodiment for two or more uncertain parameters and two realizations for each parameter. Here we explain the REO concept shown in FIG. 2, assuming optimizing robustness of only one uncertain parameter, which requires 2 realizations. However, this REO concept does not exclude optimizing robustness for more than one uncertain parameter simultaneously. If REO optimizes robustness for N uncertain parameters, preferably at least 2*N realizations are used.

Because REO seeks to expand the robustness range of a set of decision variables, it only requires 2 realizations per uncertain parameter for each generated decision strategy. Realizations 1 and 2 represent system parameter-multipliers (hereafter referred to as P-multiplier)$\leq 1$ and $\geq 1$, respectively. The OF value is computed based upon both realizations. The below discussion is for a one-parameter, two-realization application.

To begin 10, the REO receives information 12 on the uncertain parameter for which robustness will be maximized, parameter multiplier (P-multipliers or P-multiplication factors) initial values, increments and bounds. Further decision strategies are input or generated for two realizations 12. With respect to the initial robustness range, entering 0.95 and 1.05 means that Realization 1 uses an initial P-multiplier of 0.95, hence all parameter values are reduced by 5%. Realization 2 uses an initial P-multiplier of 1.05 causing all parameter values to be increased by 5%. The model develops each new system parameter realization automatically as the product of the P-multiplication factor and the base parameter value for that cell. The P-multiplier increment is the step size by which a P-multiplier is decreased or increased during robustness evaluation. The lower and upper bound on robustness range prevents the model from expanding the robustness range beyond these values.

Initial strategies' objective function values are evaluated based on 2 realizations 14. If at least one strategy is feasible for at least one realization 22, the Robustness Evaluator 16 is called for modifying the robustness range before continuing with subsequent optimization rounds.

Within one optimization round, operations and actions are performed pertinent to the selected optimization solver 30. For example, for a genetic algorithm, the main operations are parent selection, crossover, and mutation, whereas for a simulated annealing algorithm the main operations are perturbation and cooling. REO is not restricted to any particular solver or optimization solver but can be used with any of many types—examples include genetic algorithm (GA), simulated annealing (SA), tabu search (TS), and artificial neural network (ANN)—genetic algorithm optimization, and classical optimizers such as SIMPLEX, branch and bound, gradient search, and outer approximation.

Further, at the end of every optimization round, the model determines whether there are feasible decision strategies for any realization 70. If there are no feasible strategies for either realization, the model proceeds to the next optimization round 40 without modifying the robustness range. However, if either or both of the realizations yield feasible strategies the model changes the robustness range first 16 before proceeding to the next optimization round 40.

The REO is applicable over a wide range of methods used for simulation/optimization. Specific optimization methods have been developed for many classes of global optimization problems. Additionally, general techniques have been developed that appear to have applicability to a wide range of problems.

Combinatorial problems have a linear or nonlinear function defined over a set of solutions that is finite but very large. There are a number of significant categories of combinatorial optimization problems, including network problems, scheduling, and transportation. If the function is piecewise linear, the combinatorial problem can be solved exactly with a mixed integer program method, which uses branch and bound. Heuristic methods such as simulated annealing, tabu search, genetic algorithms, and others have also been successfully applied to these problems to find approximate solutions.

General unconstrained problems have a nonlinear function over real numbers that is unconstrained (or which have simple bound constraints). A variety of partitioning strategies have been proposed to solve this problem exactly. These methods typically rely on a priori knowledge of how rapidly the function can vary (e.g. the Lipshitz constant) or the availability of an analytic formulation of the objective function. Statistical methods also use partitioning to decompose the search space, but they use a priori information (or assumptions) about how the objective function can be modeled. A wide variety of other methods have been proposed for solving these problems inexactly, including simulated annealing, genetic algorithms, clustering methods, and continuation methods, that first transform the potential function into a smoother function with fewer local minima, and then uses a local minimization procedure to trace the minima back to the original function.

General constrained problems have a nonlinear function over real numbers that is constrained. Many of the methods for unconstrained problems have been adapted to handle constraints.

The basic approach of the tabu search is to avoid entrainment in cycles by forbidding or penalizing moves which take the solution, in the next iteration, to points in the solution space previously visited (hence "tabu"). The tabu method was partly motivated by the observation that human behavior appears to operate with a random element that leads to inconsistent behavior given similar circumstances. The resulting tendency to deviate from a charted course might be regretted as a source of error but can also be source of gain. The tabu method operates in this way except that new courses are not chosen randomly. Instead, the tabu search only accepts a new (poor) solution if acceptance is necessary to avoid a path already investigated. This insures new regions of a problem's solution space will be investigated with the goal of avoiding local minima and ultimately finding the desired solution.

The tabu search begins by marching to a local minima. To avoid retracing the steps used, the method records recent moves in one or more Tabu lists. The original intent of the list was not to prevent a previous move from being repeated, but rather to insure it was not reversed. The Tabu lists are historical in nature and form the Tabu search memory. The role of the memory can change as the algorithm proceeds. At initialization the goal is make a coarse examination of the solution space, known as 'diversification', but as candidate locations are identified the search is more focused to produce local optimal solutions in a process of 'intensification'. In many cases the differences between the various implementations of the tabu method have to do with the size, variability, and adaptability of the tabu memory to a particular problem domain.

The tabu search has traditionally been used on combinatorial optimization problems. The technique is straightforwardly applied to continuous functions by choosing a discrete encoding of the problem. Many of the applications in the literature involve integer programming problems, scheduling, routing, traveling salesman and related problems.

Branch and Bound is a general search method. Suppose we wish to minimize a function f(x), where x is restricted to some feasible region (defined, e.g., by explicit mathematical constraints). To apply branch and bound, one must have a means of computing a lower bound on an instance of the optimization problem and a means of dividing the feasible region of a problem to create smaller subproblems. There must also be a way to compute an upper bound (feasible solution) for at least some instances; for practical purposes, it should be possible to compute upper bounds for some set of nontrivial feasible regions.

The branch and bound method starts by considering the original problem with the complete feasible region, which is called the root problem. The lower-bounding and upper-bounding procedures are applied to the root problem. If the bounds match, then an optimal solution has been found and the procedure terminates. Otherwise, the feasible region is divided into two or more regions, each strict subregions of the original, which together cover the whole feasible region; ideally, these subproblems partition the feasible region. These subproblems become children of the root search node. The algorithm is applied recursively to the subproblems, generating a tree of subproblems. If an optimal solution is found to a subproblem, it is a feasible solution to the full problem, but not necessarily globally optimal. Since it is feasible, it can be used to prune the rest of the tree: if the lower bound for a node exceeds the best known feasible solution, no globally optimal solution can exist in the subspace of the feasible region represented by the node. Therefore, the node can be removed from consideration. The search proceeds until all nodes have been solved or pruned, or until some specified threshold is met between the best solution found and the lower bounds on all unsolved subproblems.

Evolutionary algorithms (EAs) are search methods that utilize a form of natural selection and survival of the fittest. EAs differ from more traditional optimization techniques in that they involve a search from a "population" of solutions, not from a single point. Each iteration of an EA involves a competitive selection that weeds out poor solutions. The solutions with high "fitness" are "recombined" with other solutions by swapping parts of a solution with another. Solutions are also "mutated" by making a small change to a single element of the solution. Recombination and mutation are used to generate new solutions that are biased towards regions of the space for which good solutions have already been seen. Pseudo-code for a genetic algorithm is as follows:
  Initialize the population
  Evaluate initial population
  Repeat
  Perform competitive selection
  Apply genetic operators to generate new solutions
  Evaluate solutions in the population
  Until some convergence criteria is satisfied Several different types of evolutionary search methods were developed independently. These include (a) genetic programming (GP), which evolve programs, (b) evolutionary programming (EP), which focuses on optimizing continuous functions without recombination, (c) evolutionary strategies (ES), which focuses on optimizing continuous functions with recombination, and (d) genetic algorithms (GAs), which focuses on optimizing general combinatorial problems.

EAs are often viewed as a global optimization method although convergence to a global optimum is only guaranteed in a weak probabilistic sense. However, one of the strengths of EAs is that they perform well on "noisy" functions where there may be multiple local optima. EAs tend not to get "stuck" on local minima and can often find globally optimal solutions. EAs are well suited for a wide range of combinatorial and continuous problems, though the different variations are tailored towards specific domains:
  GPs are well suited for problems that require the determination of a function that can be simply expressed in a function form
  ES and EPs are well suited for optimizing continuous functions
  GAs are well suited for optimizing combinatorial problems (though they have occasionally been applied to continuous problems)

The recombination operation used by EAs requires that the problem can be represented in a manner that makes combinations of two solutions likely to generate interesting solutions. Consequently selecting an appropriate representation is a challenging aspect of applying these methods.

EAs have been successfully applied to a variety of optimization problems such as wire routing, scheduling, traveling salesman, image processing, engineering design, parameter fitting, computer game playing, knapsack problems, and transportation problems. The initial formulations of GP, ES, EP and GAs considered their application to unconstrained problems. Although most research on EAs continuous to consider unconstrained problems, a variety of methods have been proposed for handling constraints.

Simulated annealing is a generalization of a Monte Carlo method for examining the equations of state and frozen states of n-body systems. The concept is based on the manner in which liquids freeze or metals re-crystallize in the process of annealing. In an annealing process a melt, initially at high temperature and disordered, is slowly cooled so that the system at any time is approximately in thermodynamic equilibrium. As cooling proceeds, the system becomes more ordered and approaches a "frozen" ground state at T=0. Hence the process can be thought of as an adiabatic approach to the lowest energy state. If the initial temperature of the system is too low or cooling is done insufficiently slowly the system may become quenched forming defects or freezing out in metastable states (ie. trapped in a local minimum energy state).

The original scheme was that an initial state of a thermodynamic system was chosen at energy E and temperature T, holding T constant the initial configuration is perturbed and the change in energy dE is computed. If the change in energy is negative the new configuration is accepted. If the change in energy is positive it is accepted with a probability given by the Boltzmann factor exp $-(dE/T)$. This processes is then repeated sufficient times to give good sampling statistics for the current temperature, and then the temperature is decremented and the entire process repeated until a frozen state is achieved at T=0.

By analogy the generalization of this Monte Carlo approach to combinatorial problems is straight forward. The current state of the thermodynamic system is analogous to the current solution to the combinatorial problem, the energy equation for the thermodynamic system is analogous to at the objective function, and ground state is analogous to the global minimum. The major difficulty in implementating the algorithm is that there is no obvious analogy for the temperature T with respect to a free parameter in the combinatorial problem. Furthermore, avoidance of entrainment in local minima (quenching) is dependent on the "annealing schedule", the choice of initial temperature, how many iterations are performed at each temperature, and how much the temperature is decremented at each step as cooling proceeds.

Simulated annealing has been used in various combinatorial optimization problems and has been particularly successful in circuit design problems.

Clustering global optimization methods can be viewed as a modified form of the standard multistart procedure, which performs a local search from several points distributed over the entire search domain. A drawback of multistart is that when many starting points are used the same local minimum may be identified several times, thereby leading to an inefficient global search. Clustering methods attempt to avoid this inefficiency by carefully selecting points at which the local search is initiated. The three main steps of clustering methods are: (1) sample points in the search domain, (2) transform the sampled point to group them around the local minima, and (3) apply a clustering technique to identify groups that (hopefully) represent neighborhoods of local minima. If this procedure successfully identifies groups that represent neighborhoods of local minima, then redundant local searches can be avoided by simply starting a local search for some point within each cluster.

Clustering methods have been developed for optimizing unconstrained functions over reals. These methods assume that the objective function is relatively inexpensive because many points are randomly sampled to identify the clusters. Clustering methods are most effective for low dimensional problems, so these methods become less effective for problems of more than a few hundred variables.

Statistical global optimization algorithms employ a statistical model of the objective function to bias the selection of new sample points. These methods are justified with Bayesian arguments that suppose that the particular objective function that is being optimized comes from a class of functions that is modeled by a particular stochastic function. Information from previous samples of the objective function can be used to estimate parameters of the stochastic function, and this refined model can subsequently be used to bias the selection of points in the search domain.

This framework is designed to cover average conditions of optimization. One of the challenges of using statistical methods is the verification that the statistical model is appropriate for the class of problems to which they are applied. Additionally, it has proved difficult to devise computationally interesting versions of these algorithms for high dimensional optimization problems.

Virtually all statistical methods have been developed for objective functions defined over the real numbers. Statistical methods generally assume that the objective function is sufficiently expensive that it is reasonable for the optimization method to perform some nontrivial analysis of the points that have been previously sampled. Many statistical methods rely on dividing the search region into partitions. In practice, this limits these methods to problems with a moderate number of dimensions.

Statistical global optimization algorithms have been applied to some challenging problems. However, their application has been limited due to the complexity of the mathematical software needed to implement them.

Additional methods such as Simplex, LP, NLP, MNLP are known by those skilled in the art and are equivalents to the optimization methods described. The above descriptions of optimization methods, including preferred embodiments, are to be construed as merely illustrative and not a limitation of the scope of the present invention in any way. It will be obvious to those having skill in the art that many changes may be made to the details of the above-described embodiments without departing from the underlying principles of the invention. It will be appreciated that the methods mentioned or discussed herein are merely examples of means for performing optimization and it should be appreciated that any means for performing optimization which performs functions the same as, or equivalent to, those disclosed herein are intended to fall within the scope of a means for optimization, including those means or methods for optimization which may become available in the future. Anything which functions the same as, or equivalently to, a means for optimization falls within the scope of this element.

One embodiment of REO has an S/O model with a multiple realization approach and automatic conditioning to increase strategy robustness (and thus REO controls robustness of a system). REO maximizes robustness for selected system parameters while maintaining a predetermined value for a primary OF (such as a least cost for a cost minimization problem). It is REO's Robustness Evaluator (called after an optimization round 50, see FIGS. 2 and 3) that (i) performs the sensitivity analysis, (ii) assesses the robustness range of the optimal strategy to date and (iii) redefines the robustness range for which is optimized. The Robustness Evaluator runs simulations for different realizations 62 (i.e. 2 realizations per parameter). In one embodiment a realization is produced by multiplying a calibrated system parameter array set by an assumed factor smaller than 1 or larger than 1, respectively representing a systematic proportional reduction or increase in the array values. Robustness is evaluated for one or more system parameters simultaneously.

The Robustness Evaluator module, changes the robustness for both realizations or only for one realization, and depends on the following possibilities:

1) one or more strategies satisfy the constraints for both realizations simultaneously;
2) one or more strategies satisfy the constraints for only one of the realizations; or
3) one or more strategies satisfy the constraints for both realizations, but the strategy(ies) that satisfies(y) one realization differs from that satisfying the other realization.

With respect to the first possibility, the model selects the strategy with the best OF value and systematically decreases (P-multiplier≦1) and increases (P-multiplier≧1) for Realizations 1 and 2, respectively. If for a realization the simulation yields constraint violations, the P-multiplier is not further decreased or increased for that particular realization. This evaluation procedure is continued till simulations for both realizations yield constraint violations. The last P-multiplier values define the robustness range for the next optimization round. The procedure is the same for the second and third possibilities. However, for the second possibility the P-multiplier is only modified for the realization that yielded a feasible strategy. For the third possibility the model modifies only the first realization, and not the second. With respect to possibilities 1 and 2, a mechanism or check is included that prevents enhancing the robustness in one direction while reducing the robustness in the other direction.

After the robustness range has been modified, REO proceeds with optimization for the next optimization round 40. The REO is terminated when the target robustness range is achieved 80. If the target robustness range is not achieved, the REO is terminated after satisfying optimizer stopping criterion 80 (e.g. completing the maximum number of specified optimization rounds).

A robustness evaluator evaluates and controls the robustness of system designs (or operation). Robustness is a measure of how well a design works in reality even if selected model parameters used in optimization deviate from the real system. Control Theory maintains a similar definition: robustness means tolerance to errors in system identification (or to changes in the system during the time): even if the mathematical model of the system is slightly incorrect, the controlled system should be stable.

In engineering design, robust design generally means that the design is capable of functioning correctly, (or at least, not failing catastrophically) under many conditions. Also, it means that tolerances can be looser rather than tighter. Additionally, a robust design usually (but not always) has a high signal-to-noise ratio. In Economics robustness is a term used to define the ability of a financial trading system to remain effective under different markets and different market conditions.

One way to assess robustness of a system is to perform a sensitivity analysis. This approach, however, does not tell how to make a solution more robust. This approach systematically changes values of selected system parameters. One would change a parameter value (for example, increase or decrease its value by 1%), run a simulation and assess whether the design still satisfies all constraints or one would assess if assuming these new values still would satisfy system performance or the decision-maker's goal. Repeating this process till the system performance is unsatisfactory yields an insight in the robustness of the system. An alternative approach would be to develop stochastic realizations of design samples (selected system parameters) using Monte Carlo simulations.

An alternative to robustness evaluation methods are reliability estimator methods. Reliability is determined by: (a) developing many alternative realities (realizations) of the study area by changing model assumptions stochastically based on a probability density function or statistically derived information; and then (b) simulating how a particular decision strategy affects the system represented by each realization (i.e., by running one simulation of the strategy per realization). A 'realization' is an "assumed reality" or one set of (physical) system parameters assumed within a model. If the results of a simulation satisfy all optimization problem constraints, the strategy is considered feasible for that realization. A decision strategy's reliability is the percentage of N-realizations that yield feasible results for that strategy (with N greater than 1). The major drawback of reliability methods is that often for real systems there is insufficient statistical data for developing a probability density function accurately.

Examples of developing reliable systems are chance-constrained programming (CCP) and multiple realization approach (MRA). In CCP, relations based on a probability distribution are incorporated as constraints in the optimization problem. The MRA puts constraints of several different realizations into one optimization model. A realization is generated using a stochastic number generator. The optimization model satisfies all the constraints of all realizations simultaneously. CCP and MRA are powerful mathematical tools for developing reliable strategies and for developing tradeoff curves for reliability versus cost. However, both approaches have historically relied upon the ability to quantify random processes and establish a probability density function (PDF) for real system parameters. Accurately establishing a PDF requires a significant amount of real system data. For most real-world problems there is insufficient accurate real system data collection.

Additional methods are known by those skilled in the art and are equivalents to the robustness evaluation methods described. The above descriptions of robustness evaluation methods, including preferred embodiments, are to be construed as merely illustrative and not a limitation of the scope of the present invention in any way. It will be obvious to those having skill in the art that many changes may be made to the details of the above-described embodiments without departing from the underlying principles of the invention. It will be appreciated that the methods mentioned or discussed herein are merely examples of means for performing robustness evaluation and it should be appreciated that any means for performing robustness evaluation which performs functions the same as, or equivalent to, those disclosed herein are intended to fall within the scope of a means for robustness evaluation, including those means or methods for robustness evaluation which may become available in the future. Anything which functions the same as, or equivalently to, a means for robustness evaluation falls within the scope of this element.

Description of the Example Case Study

The REO is applied to remediation models for underground contamination of trinitrotoluene and Royal Demolition Explosive plumes at Umatilla Chemical Depot (UCD) in Oregon to develop robust least cost strategies. The REO efficiently develops robust pumping strategies while maintaining primary OF value optimality—differing from the common situation in which a primary OF value degrades as strategy reliability increases. UCD, in Hermiston, Oreg., is a 79.8 km$^2$ (19,728 acres) military reservation. UCD operated an onsite explosives washout plant from the 1950s until 1965 during which time an estimated 322 million liters of contaminated waste water were discharged into unlined lagoons. Although lagoon sludge was removed regularly during plant operation, explosives contained in the wash water migrated into the soil and ground water. The ground water table is approximately 14.3 m below the lagoons. UCD was put on the Environmental Protection Agency's National Priorities List in 1987 because soil and ground water contamination of the lagoons exceeded 4,800 parts per million (ppm). The main contaminants are RDX (Hexahydro-1,3,5-trinitro-1,3,5-triazine) and TNT (2,4,6-Trinitrotoluene).

In 1997 a pump-and-treat system began operating using 3 extraction wells and 4 injection basins (FIG. 3). Contaminants are removed by a granular active carbon unit (GAC) sometimes working at 82 liters per second (l/s) (1300 gallons per minute or gpm) peak capacity (Geotrans 2001). Model-predicted RDX and TNT cleanup times to maximum cleanup levels (risk-based values) of 2.1 microgram per liter (µg/l) or parts per billion (ppb) RDX and 2.8 µg/l TNT under the current system are 8 and 17 years, respectively. Projected cost is $3.836 Million (M) in net present value assuming a 5 percent discount rate.

Site ground water remediation planning employs a modular finite-difference ground water flow model, MODFLOW and a modular three-dimensional transport model, MT3DMS. The transient flow model consists of 5 layers, 125 rows, and 132 columns, of which the largest cell size is 197.5 m×169.7 m, and the smallest cell size is 7.6 m×6.6 m. Layer 1 (alluvial aquifer) is simulated as an unconfined aquifer, and Layers 2-5 (silt and weathered basalt) are simulated as confined/unconfined aquifers with variable transmissivity. All four study area lateral boundaries are represented by constant head cells. A net recharge of 12.7 millimeter per year (mm/y) is assumed for Layer 1.

The model domain is divided into Regions 1 and 2 (dotted diagonal line in FIG. 3) for which there are different maximum limits imposed on pumping from wells. There are many calibrated K values within the two regions and straddling the demarcation line. For this embodiment the initial RDX and TNT concentrations were those projected to exist in January 2003 (FIG. 3). The RDX plume is larger than the TNT plume. The RDX and TNT plumes slightly overlap at the northern tip of the RDX plume. The model is designed for 20 years simulation, consisting of four 5-year stress periods.

K is heterogeneous for the different layers and each layer is divided into zones of homogenous K. For layer 1 the K field ranges from 0.3 m/day to 1503 m/day and for Layers 2-5 K ranges from 0.3 m/day to 1.7 m/day.

The intent of the remediation strategy is to utilize and enhance the current pump-and-treat system as needed to minimize present value cost of RDX and TNT cleanup, subject to:

a) reducing RDX and TNT concentrations to below the cleanup levels (2.1 ppb and 2.8 ppb, respectively) within a cleanup zone within 20 years;

b) preventing RDX and TNT from departing the cleanup zone at concentrations exceeding their respective cleanup levels;

c) not exceeding 73.8 l/s (1170 gpm) time average of total pumping (90% of the 82 l/s current treatment plant capacity);

d) forcing the absolute different between total pumping and total recharge through recharge basins$\leq$1 gpm; and e) employing an upper limit on extraction of 25.2 l/s (400 gpm) and 63.1 l/s (1000 gpm) at a single well in Regions 1 and 2, respectively (FIG. 1).

Ground Water Management Applications

I. Assessing the Robustness of the Deterministic Optimization Results

For the above formulation three optimal pumping strategies that satisfy all constraints and achieve cleanup within 4 years are calculated (Table 1). Each strategy uses 2 existing extraction wells (EW1 and EW2), 2 existing infiltration basins (IF2 and IF3) and 2 new extraction wells (U1 and U2). Well U2 is in a different location in Strategy 1 and Strategy 2. Strategy 1 has total pumping of 72.7 l/s (1153 gpm) and Strategy 2 has total pumping of 73.8 l/s (1170 gpm) (Table 1). Strategy 3 uses the same wells and infiltration basins and has the same total pumping as Strategy 2 but differs in flows at the wells and infiltration basins.

TABLE 1

Pumping Well Locations and Rates for Strategies 1-3

| | | Strategy*: | | |
| | | I | II | III |
| | | extraction/injection rate (l/s) | | |
|---|---|---|---|---|
| EW3 | 1 53 59 | 22.1 | 22.7 | 22.7 |
| EW1 | 1 60 65 | 22.4 | 22.6 | 22.7 |
| EW2 | 1 83 84 | 0 | 0 | 0 |
| EW4 | 1 85 86 | 0 | 0 | 0 |
| IW1 | 1 30 39 | 0 | 0 | 0 |
| | 1 30 40 | | | |
| | 1 31 39 | | | |
| | 1 31 40 | | | |
| IW2 | 1 104 102 | 28.6 | 29.7 | 27.5 |
| | 1 105 102 | | | |
| IW3 | 1 109 23 | 44.2 | 44.1 | 46.3 |
| | 1 109 24 | | | |
| | 1 110 23 | | | |
| | 1 110 24 | | | |
| U1 | 1 48 57 | 22.7 | 22.7 | 22.7 |
| U2 | 1 65 60 | 5.5 | 0 | 0 |
| U2 | 1 58 60 | 0 | 5.8 | 5.7 |
| Total pumping (l/s) | | 72.8 | 73.8 | 73.8 |

The selection of the new wells for each strategy results from optimization. It has been shown that there are hundreds of different combinations of well locations that can yield the same total cost for the calibrated set of K values. FIG. 5 shows the results of simulating Strategy 2 but using a different well location for the new well U2 within the region of row 52/column 52 and row 71/column 71 (cells containing wells EW1 and EW3 are excluded). Results show that 89% of the 398 evaluated U2 well locations yield feasible solutions and virtually the same least cost in deterministic transport optimization (i.e. installing two new extraction wells and pumping at near the maximum rate maintains containment and achieves cleanup within 4 years). For this site and optimization problem there are a huge number of pumping strategies that will yield the same objective function value, using different well locations. Depending on whether one uses discrete or continuous pumping rates, one might have an infinite number of pumping strategies of comparable objective function (OF) value.

If field aquifer K values differ from the model or other aquifer parameter values, cleanup might take more or less time than expected. If it takes more time, actual field objective function value cost will increase. Differences between field and model can occur in all assumed parameters, including boundary conditions. Thus, although deterministic S/O modeling can yield a mathematically optimal strategy, it is not necessarily a robust strategy. This is illustrated by performing robustness analysis on Strategies 1 and 2 and Strategy 3 and six modifications of each of those. Each modification differs only in the location of well U2. Robustness analysis involved simulating response to a range of realizations. Each realization uses a different K array multiplier varying between 0.84 and 1.19, representing a −16% to 19% range in K value from the original model. Using a 0.01 interval in K multiplier yields 34 realizations for each strategy and each U2 well location, a total of 714 simulations.

FIGS. 6-8 show the results of evaluating the robustness of Strategies 1, 2, and 3, respectively, for the 714 simulations. Different U2 well locations yield different robustness. The width from left to right of a bar shows the robustness range for a strategy using a particular location for well U2. The wider the bar, the more robust the strategy is (4-year cleanup is achieved for that range of K-multipliers). Although many U2 well locations yield feasible and optimal results for the base K values, not all U2 well locations yield a robust strategy. Strategy 1 is the least robust strategy. This largely results from its reduced total pumping and cost. Strategy 3 is generally more robust than Strategy 2. Although both strategies use the same U2 well location and have the same total pumping and cost, the distribution of pumping rates among the existing and candidate wells and infiltration basins also affects strategy robustness.

Strategy 2 might not be the best implementable strategy because it shows only 7% robustness on the positive side (i.e. the range is from −15% to +7% and is not well balanced). For the same U2 well location, Strategy 3 shows a robustness of −15% to 17%. Strategy 3 with U2 well location (1,57,62) has a well balanced robustness range of approximately ±16%.

As indicated previously, the degree of robustness can profoundly affect actual costs after a strategy is implemented. A robust strategy is more likely to actually satisfy the cleanup constraints in the field than a less robust strategy. FIG. 9 illustrates this for 6 different U2 well locations for Strategy 3.

FIG. 9 illustrates that beyond the robustness range that yields feasible solutions, cost increases as a function of the year in which cleanup occurs. For example, Chart A shows that an 8% increase in K causes the cost to increase by 20% because RDX cleanup occurs in year 5 instead of year 4. Similarly, decreasing K by 15% causes cost to increase significantly because cleanup time goes beyond 20 years.

II. REO Application and Results

The previous section demonstrates that strategy robustness is affected by well locations and pumping rate distribution. Post-optimization robustness analysis helps determine which strategy is most suitable for implementation. However, that approach is less efficient than directly trying to address robustness during optimization. On the other hand, REO automatically filters out candidate well locations or pumping rates that do not yield a good robustness.

When applying the REO to UCD, the optimization problem constraints are the same as defined in section describing the case study and formation. For two reasons however, the objective function goal is to reduce RDX and TNT concentrations to slightly less than the regulatory cleanup levels within four years. First, the achieved concentrations need to be a little lower than the regulatory cleanup levels to identify strategies most likely to be robust. Second, if cleanup cannot be achieved within 4 years, the cleanup cost will exceed the minimum cost determined previously. Thus the OF is to minimize the weighted overachievement of a target maximum concentration in the cleanup zone (Eq. 1).

$$\min z = (W)(C^+)$$

where z=OF value; (W) is a vector of weighting coefficients; ($C^+$) is a vector of overachievement values (i.e., computed value−target value). The target values are 2.0 and 2.7 ppb for RXD and TNT, respectively. These values are 0.1 ppb lower than the cleanup levels. If the targets were 2.1 ppb and 2.8 ppb, respectively, all feasible strategies would yield zero OF values, and strategies that can achieve lower concentrations would not be identified. It is expected that a strategy that can achieve lower target concentrations is likely to be more robust at achieving the higher cleanup levels.

We present three scenarios. Scenario 1 optimizes robustness for Strategy 1 using well U2 at location (1,65,60), whereas Scenario 2 optimizes robustness for Strategy 2 using well U2 at location (1,58,60). Scenario 3 optimizes robustness but uses 7 candidate well locations for well U2: (1,58.60), (1,65,60), (1,61,61), (1,57,62), (1,54,64), (1,49, 62), (1,54,58). Each scenario is repeated 3 times because of the randomness associated with optimizers. Here we use the genetic algorithm linked with tabu search (GA-TS) optimization solver. GA-TS consists of multiple optimizer rounds, called generations, and performs operations such as parent selection, crossover, and mutation. GA-TS is initialized by randomly generated strategies (in Generation 1) or by feeding previously developed strategies into the first generation. Table 2 summarizes some REO input for each scenario.

TABLE 2

REO Input for Scenarios 1, 2, and 3

| Description | Scenario 1 | Scenario 2 | Scenario 3 |
|---|---|---|---|
| Starting robustness range (%) | ±0% | ±0% | ±5% |
| Starting K-multiplication factor $R_1$* | 1 | 1 | 0.95 |
| Starting K-multiplication factor $R_2$ | 1 | 1 | 1.05 |
| Target robustness (%) | ±20% | ±20% | ±20% |
| Target K-multiplication factor $R_1$ | 0.8 | 0.8 | 0.8 |
| Target K-multiplication factor $R_2$ | 1.2 | 1.2 | 1.2 |
| Population size generation 1 | 20 | 20 | 50 |
| Population size additional generations | 20 | 20 | 20 |
| Total number of generations | 30 | 30 | 40 |

*$R_1$ = Realization 1;
$R_2$ = Realization 2

For Scenario 1 the REO is initialized by filling Generation 1 with twenty replicas of Strategy 1. Scenario 2 is initialized using twenty replicas of Strategy 2. Scenario 3 randomly generates 50 strategies for both realizations (+5% initial robustness range) in Generation 1.

FIGS. 10, 11, and 12 show the evolution of the expansion of the robustness range for Scenarios 1, 2, and 3, respectively. Scenario 1 achieves a maximum possible robustness range from −10% to +20%. For Scenarios 2 and 3 this range is from −15% to +19%. In Scenario 3, all runs eventually converge to the same U2 well location, located at (1, 58, 60). However, during optimization another U2 well location satisfies the intermediate robustness criterion at the end of several generations (Table 3). Table 4 shows the computed cost for each optimal strategy developed in Scenarios 1, 2, and 3 using a post processor program. All runs for the 3 scenarios maintain a least cost strategy using a total pumping of 73.8 l/s (1170 gpm). Scenario 1 shows slightly higher total costs because of increased VCG cost (variable cost for granular activated carbon), which is a function of influent concentration. Scenario 1 least cost strategy uses a different well U2 location than Scenarios 2 and 3, which may affect the influent concentration. The results demonstrate that REO develops optimal pumping strategies that maintain the least cost while it maximizes the robustness of a pumping strategy.

TABLE 3

Candidate Well Locations Satisfying Robustness Range During Optimization for Scenario 3, Runs 1-3

| Scenario 1 | | Scenario 2 | | Scenario 3 | |
|---|---|---|---|---|---|
| Generation | $CEW^2$ | Generation | CEW | Generation | CEW |
| 1 | 1, 49, 62 | 1 | 1, 58, 60 | 1 | 1, 57, 62 |
| 13 | 1, 58, 60 | 2 | 1, 57, 62 | 2 | 1, 57, 62 |
|  |  | 3 | 1, 57, 62 | 6 | 1, 58, 60 |
|  |  | 11 | 1, 58, 60 |  |  |
|  |  | 17 | 1, 58, 60 |  |  |

[1]Generation in which a feasible strategy is developed for the current robustness range
[2]Candidate extraction well location (layer, row, column)

The presented REO automatically develops robust optimal decision strategies, and is useful where realistic probability density functions of system parameters do not exist. Application to UCD demonstrates that the procedure efficiently develops robust optimal pumping strategies with a maximum possible robustness range of −10% to +20% for Scenario 1, and −15% to +19% for Scenarios 2 and 3, while maintaining least cost values. This procedure maximizes the robustness of achieving goals in the field and not merely in the model, even though sufficient data to establish a PDF was not available for UCD.

TABLE 4

Cost and Total Pumping Values for Scenarios 1-3

| | Scenario 1 | | | Scenario 2 | | | Scenario 3 | | |
|---|---|---|---|---|---|---|---|---|---|
| | Run 1 | Run 2 | Run 3 | Run 1 | Run 2 | Run 3 | Run 1 | Run 2 | Run 3 |
| Cost (x$1000) | 1664.49 | 1664.50 | 1664.49 | 1664.19 | 1664.18 | 1664.21 | 1664.20 | 1664.20 | 1664.21 |
| Total pumping (l/s) | 73.8 | 73.8 | 73.8 | 73.8 | 73.8 | 73.8 | 73.8 | 73.8 | 73.8 |

The REO increases decision strategy robustness, and maintains the optimality of the primary OF value. This differs from a more general stochastic optimization result in which a primary OF value degrades as strategy reliability increases. Because REO requires much less field data to implement, REO-developed strategies might not achieve as high a mathematical reliability as strategies developed using many realizations based upon real aquifer parameter PDFs. REO should be useful, because sensitivity analysis is common practice, and REO combines that with optimization.

One should exercise care in implementing decision strategies in the field. Optimization creates a strategy that has tight optimization problem constraints in the computer. The tighter the constraints, the more risk that a strategy might not achieve its goals in the field—because a small difference between the model and the field is more likely to cause violation of a tight constraint than a loose constraint. A modeler can control how close to a real-world constraint a pumping strategy can come within the computer. In effect, one can use safety factors in designing an optimal strategy.

Alternatively, one can include in a compound OF the cost of failure to satisfy a constraint in the field. Reliability in the field is usually inversely related to the optimality of a simple cost OF that does not include the cost of failure. The SOMOS users manual shows how to implement compound objective functions, deterministic flow and transport optimization, stochastic optimization, and REO.

The above description fully discloses the invention including preferred embodiments thereof. The examples and embodiments disclosed herein are to be construed as merely illustrative and not a limitation of the scope of the present invention in any way. It will be obvious to those having skill in the art that many changes may be made to the details of the above-described embodiments without departing from the underlying principles of the invention.

What is claimed is:

1. A computer-implemented apparatus for robustness enhancing optimization of a physical system, comprising:
   a simulation-optimization computational engine implemented in the apparatus;
   a memory associated with said simulation-optimization computational engine for storing computation results;
   a data storage means for storing said computation results in said memory;
   a realization comprising a set of values of physical parameters for a model of the physical system;
   an optimization stopping criterion;
   a robustness evaluator;
   an optimizer in said simulation-optimization computational engine that develops an optimal strategy for each one of one or more primary objective functions, and modifies said strategy to increase the likelihood that the strategy will satisfy specified goals and constraints in the physical system without degrading primary objective function values beyond specified limits;
   wherein the apparatus performs robustness enhancing optimization by:
   (a) said optimizer in said simulation-optimization computational engine computing an optimal objective function value and a strategy comprising a set of values for decision variables for said realization;
   (b) said data storage means storing said computed strategy in said memory;
   (c) said robustness evaluator receiving said computed strategy;
   (d) said robustness evaluator evaluating robustness for said computed strategy by modifying said realization by multiplying the values of the set of physical parameters for the model by a factor smaller than 1 and determining that all constraints are maintained and the objective function value is within acceptable tolerance of the objective function value;
   (e) inputting output from said robustness evaluator to said simulation-optimization computational engine, performing optimization to improve the objective function value while satisfying constraints and computing a new strategy with a new set of decision variable values for said modified realization;
   (f) iterating through steps (b) through (e) using said new strategy as input to said computational engine until said optimization stopping criterion is met, resulting in at least one constraint violation; and
   (g) outputting a smallest multiplier for the physical parameter realization that still provides the objective function value within acceptable tolerance while maintaining all problem constraints.

2. A computer-implemented apparatus for robustness enhancing optimization of a physical system, comprising:
   a simulation-optimization computational engine implemented in the apparatus;
   a memory associated with said simulation-optimization computational engine for storing computation results;
   a data storage means for storing said computation results in said memory;
   a realization comprising a set of values of physical parameters for a model of the physical system;
   an optimization stopping criterion;
   a robustness evaluator;
   an optimizer in said simulation-optimization computational engine that develops an optimal strategy for each one of one or more primary objective functions, and modifies said strategy to increase the likelihood that the strategy will satisfy specified goals and constraints in the physical system without degrading primary objective function values beyond specified limits;
   wherein the apparatus performs robustness enhancing optimization by:
   (a) said optimizer in said simulation-optimization computational engine computing an optimal objective function value and a strategy comprising a set of values for decision variables for said realization;
   (b) said data storage means storing said computed strategy in said memory;
   (c) said robustness evaluator receiving said computed strategy;
   (d) said robustness evaluator evaluating robustness for said computed strategy by modifying said realization by multiplying the values of the set of physical parameters for the model by a factor larger than 1 and determining that all constraints are maintained and the objective function value is within acceptable tolerance of the objective function value;
   (e) inputting output from said robustness evaluator to said simulation-optimization computational engine, performing optimization to improve the objective function value while satisfying constraints and computing a new strategy with a new set of decision variable values for said modified realization;
   (f) iterating through steps (b) through (e) using said new strategy as input to said computational engine until said optimization stopping criterion is met, resulting in at least one constraint violation; and
   (g) outputting a largest multiplier for the physical parameter realization that still provides the objective function value within acceptable tolerance while maintaining all problem constraints.

3. A computer implemented method for robustness enhancing optimization of a physical system, based on a realization comprising a set of values of physical parameters for a model of the physical system, the method comprising:
   (a) an optimizer in a simulation-optimization computational engine computing an optimal objective function value and a strategy comprising a set of values for decision variables for said realization;
   (b) a data storage means storing said computed strategy in a memory;
   (c) a robustness evaluator receiving said computed strategy;

(d) said robustness evaluator evaluating robustness for said computed strategy by modifying said realization by multiplying the values of the set of physical parameters for the model by a factor smaller than 1 and determining that all constraints are maintained and the objective function value is within acceptable tolerance of the objective function value;

(e) inputting output from said robustness evaluator to said simulation-optimization computational engine, performing optimization to improve the objective function value while satisfying constraints and computing a new strategy with a new set of decision variable values for said modified realization;

(f) iterating through steps (b) through (e) using said new strategy as input to said computational engine until a specified optimization stopping criterion is met, resulting in at least one constraint violation; and (g) outputting a smallest multiplier for the physical parameter realization that still provides the objective function value within acceptable tolerance while maintaining all problem constraints.

4. A computer implemented method for robustness enhancing optimization of a physical system, based on a realization comprising a set of values of physical parameters for a model of the physical system, the method comprising:

(a) an optimizer in a simulation-optimization computational engine computing an optimal objective function value and a strategy comprising a set of values for decision variables for said realization;

(b) a data storage means storing said computed strategy in a memory;

(c) a robustness evaluator receiving said computed strategy;

(d) said robustness evaluator evaluating robustness for said computed strategy by modifying said realization by multiplying the values of the set of physical parameters for the model by a factor larger than 1 and determining that all constraints are maintained and the objective function value is within acceptable tolerance of the objective function value;

(e) inputting output from said robustness evaluator to said simulation-optimization computational engine, performing optimization to improve the objective function value while satisfying constraints and computing a new strategy with a new set of decision variable values for said modified realization;

(f) iterating through steps (b) through (e) using said new strategy as input to said computational engine until a specified optimization stopping criterion is met, resulting in at least one constraint violation; and (g) outputting a largest multiplier for the physical parameter realization that still provides the objective function value within acceptable tolerance while maintaining all problem constraints.

* * * * *